UNITED STATES PATENT OFFICE 2,039,940

PREVENTIVE INOCULATION, MORE PARTICULARLY FOR PERITONITIS

Bernhard Steinberg, Toledo, Ohio, assignor to Toledo Hospital, Toledo, Ohio, a corporation of Ohio No Drawing. Application April 25, 1934, Serial No. 722,317

1 Claim. (Cl. 167—78)

This invention relates to the production of a substance and treatment, more particularly of human beings, for protection of the peritoneum against infection.

This invention has utility when incorporated in the preparation of a sterile or impotent substance and the introduction thereof into the peritoneal cavity.

In carrying out the invention herein, desirably hemolytic bacteria of the general bacilli type are selected. Especially advantageous results have been obtained hereunder in the matter of the colon bacilli hemolytic communis and communior. In carrying out production hereunder, a colony is introduced on a slant of agar in a test tube. This is exposed to a temperature of 37° C. for twenty-four hours, when the slant is coated with the growth of the bacilli. This growth or coating is washed off or removed by a physiological saline solution. This solution, as adapted herein, is of nine-tenths of one per cent by weight sodium chlorid as to distilled water. This washed-off growth from the slant is then subjected to a temperature of 80° C. for ten minutes, effective by heat to kill this strain of colon bacillus. This substance is then subjected to centrifuge action of three or four washes of this physiological saline solution. These washes are effective to remove toxic or poisonous and undesirable portions from the retained mass accumulated in the bottom of the test tube. This mass is washed out with sufficient saline solution to maintain such in suspension, and introduced into a suspension of gum tragacanth. This gum tragacanth suspension is a one per cent suspension by weight of gum tragacanth as to water. The killed colon bacilli are agitated in this gum tragacanth solution so that they are thoroughly and uniformly in suspension throughout and the resultant product is one of even cloudiness.

In connection with the foregoing specific instance of preparation as to the product, it is pointed out that importance resides in impotent bacterial or organic substance more particularly as set forth hereunder. The purpose herein is that the colonies used are pathogenically inactive and not in a condition to multiply themselves but are rendered impotent or sterile. There are advantages in that the substance is a killed bacteria. Additional advantage arises in the solution in which these bacteria are dispersed. The physiological saline solution is one found satisfactory, although distilled water, other slightly alkaline or different degree and kind of salt solution may be adopted. The suspension medium colloid, which more particularly may be the gelatine selected as gum tragacanth, is to be a carrier for the agent, which carrier holds the agent against dissipation or dispersion from the cavity into which introduced, especially against ready dispersion or dissipation through the walls of the cavity. In the instance of the peritoneal cavity, the blood vessels or lymphatic channels are ineffective readily to take up this agent which has the property of inducing resistance to the onset of peritonitis.

The cloudy medium is administered preferably as a preoperative step as to a surgical operation by intra-peritoneal injection, in an adult individual, of say thirty cubic centimeters of the suspension, in which the organisms may run as high as two hundred million per cubic centimeter. The point of injection is in the midline below the umbilicus. In practice the urinary bladder is emptied. The needle used may be, say number fifteen gage and two inches long to insure penetration of the abdominal wall. The material is forced through the needle with a syringe. There is no danger of penetrating the bowel, especially if such be not distended.

The clinical procedure is desirably one in which morphine sulphate is given one-half hour prior to the injection and repeated at four-hour intervals for say sixteen hours. The reactions are abdominal pain and slight elevation of temperature. These are incidental to peritoneal irritation and can be controlled with the morphine. Occasionally, there is abdominal rigidity and chills. The substance hereunder, as thus in solution and dispersed in the peritoneal cavity, seems to induce in the patient accumulation in the peritoneal cavity of a polymorphonuclear response.

It is desirable the injection occur from twelve to forty-eight hours prior to the surgical operation. This response evokes quite rapidly large numbers of polymorphonuclears which are thus made available if an infection sets up. The infection is overcome by phagocytosis, which is prompt and thorough due to this hyperleukocytosis. In fact, in practice it has been found that the bacteria during peritonitis are almost completely phagocytosed within two or three hours. This protective advantage extends to avoid hazard or danger from peritoneal soiling: resection of intestine (especially large bowel), intestinal anastomosis, "interval" appendectomy, chronic pelvic conditions with adhesions, requiring removal of pelvic organs.

This experience gives basis for the substance herein disclosed and its peculiar utility in that it is not readily dissipated from the peritoneal cavity; that it, as injected and dispersed about the peritoneum, is not taken up by phagocytes, capillaries, or lymphatics in appreciable amounts, so that in its practically full quantity it seems still to persist for an adequate time under the experience had which has seemingly evidenced effectiveness present for twenty-six days after the original injection.

This evidence of effectiveness is in the accumulation of white corpuscles, neutrophilic polymorphonuclear leucocytes which are present in excess to be effective at once in the presence of the live bacilli which are hazardous in the matter of the disease which it is sought to combat and which are the hazard, especially in abdominal operations.

The product prepared as above and kept at normal temperature seems to be efficacious over a period of months without noticeable loss in the degree of its potency.

What is claimed and it is desired to secure by Letters Patent is:

A composition of matter suitable for injection for inducing resistance against peritonitis comprising killed colon bacilli in an aqueous suspension of gum tragacanth.

BERNHARD STEINBERG.